Patented Apr. 8, 1952

2,591,710

UNITED STATES PATENT OFFICE 2,591,710

PRODUCTION OF FUSED CYCLIC THIOPHENE COMPOUNDS

Rush F. McCleary, Beacon, N. Y., and Lawrence W. Devaney, Waco, Tex., assignors to The Texas Company, New York, N. Y., a corporation of Delaware No Drawing. Application November 6, 1947, Serial No. 784,506

14 Claims. (Cl. 260—329)

This invention relates to an improved process for the production of heterocyclic sulfur compounds; the invention is particularly concerned with the preparation of fused cyclic derivatives of thiophene in which a cyclic nucleus and a thiophene nucleus share two carbon atoms.

Heterocyclic sulfur compounds, such as those containing a thiophene nucleus, have, in the past, been primarily of an academic interest due to the uneconomical and difficult methods required for the preparation thereof. Recent developments, however, have shown that thiophene and its homologs may be synthesized by a method involving use of economical charge stocks which is readily adaptable to commercial operation. In co-pending applications, Serial No. 630,148, filed November 21, 1945, and Serial No. 773,310, filed September 10, 1947, both of which are entitled, "Preparation of Thiophene Compounds" and of which Louis E. Ruidisch and duBois Eastman are the co-inventors, there is broadly disclosed a commercially feasible method for preparing thiophene derivatives, which comprises catalytic reaction of hydrogen sulfide with organic compounds containing an aliphatic chain of at least two carbon atoms in the vapor phase in the presence of a surface-active type of solid catalyst. The processes of these two co-pending applications are mainly concerned with the formation of thiophene compounds and thiophene homologs from aliphatic hydrocarbons such as butane and pentane. The present invention particularly involves the preparation of fused cyclic derivatives of thiophene, in which a cyclic nucleus and a thiophene nucleus share two carbon atoms, by the reaction of alkyl cyclic compounds with hydrogen sulfide.

The process of the invention broadly involves the vapor phase reaction of a cyclic compound containing an alkyl substituent which consists of at least two carbon atoms with hydrogen sulfide in the presence of a surface-active solid catalyst at an elevated temperature of at least 700° F. A volatile, thermally labile sulfide may be used in place of or in addition to hydrogen sulfide. In the preferred aspect of the invention, cyclic compounds containing an alkyl group of at least two carbon atoms in length are reacted with hydrogen sulfide at an elevated temperature of between about 700 and 1400° F. in the presence of dehydrogenation type catalysts such as molybdena-alumina and silica-chromia-alumina.

The invention is particularly adaptable to the preparation of fused aryl derivatives of thiophene such as thionaphthene (also called "benzothiophene"), wherein two carbon atoms are shared by the respective aryl and thiophene nuclei. In this preferred modification, the organic charge stock comprises alkyl-substituted aryl compounds wherein the alkyl group contains at least two carbon atoms; ethylbenzene, styrene, cumene and para-cymene are typical examples of alkyl aryl compounds which form a preferred charge stock in the method of this invention. The process of invention is illustrated by the following equation wherein styrene is reacted with hydrogen sulfide to form thionaphthene.

$$C_6H_5CH=CH_2 + H_2S \rightarrow C_6H_4C_2H_2S + 2H_2$$

In general, cyclic compounds containing an alkyl group which consists of at least two carbon atoms, may be employed as the organic charge stock. The type of cyclic derivative of thiophene produced in the reactions depends to a large extent on the choice of charge stock used in the reaction. Naphthenic derivatives of thiophene can be prepared by the use of a charge material comprising alkyl naphthenes in which the alkyl group contains at least two carbon atoms. Alkyl-substituted heterocyclics, such as 3-ethyl thiophene or ethyl pyridine, may also be used as the alkylated cyclic charge material. As has been indicated in the previous paragraph, the preferred charge material comprises alkyl aromatics in which the alkyl group contains at least two carbons; fused aryl thiophene derivatives result from the employment of alkyl aromatics as the charge material in the process of the invention. There appears to be no limit on the chain length of the alkyl group in the alkyl-substituted cyclic compound employed in the process of the invention, with the exception that the hydrocarbon should be in the vapor form under reaction conditions. When really simple reaction products are desired, however, it is advisable to employ a charge stock containing an alkyl-substituted cyclic compound in which the alkyl group contains from about two to eight carbon atoms.

The process also includes the use of compounds other than unsubstituted alkylated cyclic hydrocarbons as the charge stock. There may also be employed substituted alkylated cyclic hydrocarbons in which the substituents either remain attached to the hydrocarbon during the reaction or are removed during the reaction to form compounds which do not have a substantially adverse effect on the reaction. The substituents may be attached either to the cyclic nucleus or to the alkyl group of substituted alkylated cyclic hydrocarbons employable as the charge material. Examples of such substituted alkylated cyclic hydrocarbons are halogenated derivatives, such as para-chloro ethylbenzene and hydroxy derivatives, such as phenylethyl alcohol. In substituted cyclic compounds containing an alkyl group consisting of at least two carbon atoms, the main requirement is that the alkyl group have a beta carbon atom available for reaction, by which is meant that the beta carbon atom in the alkyl group must contain at least one hydrogen atom attached thereto or a readily replaceable group such as a hydroxyl group, chlorine or bromine.

As previously stated, the sulfur reactant may be either hydrogen sulfide or a volatile thermally labile sulfide. It is preferred, of course, to use hydrogen sulfide; but it may be replaced in whole or in part by other sulfides which are volatile and thermally labile under the conditions of reaction, including organic and inorganic sulfides, hydrosulfides and polysulfides which are decomposed to hydrogen sulfide and/or sulfur, under reaction conditions. Metal sulfides are excluded from the usable inorganic sulfides since they decompose to non-volatile metallic constituents which tend to deposit on the catalytic surfaces and destroy catalyst activity. Thus, only non-metal and metalloid inorganic sulfides are included within the scope of inorganic volatile thermally labile sulfides; examples of such are ammonium sulfide, ammonium hydrosulfide and ammonium polysulfide. Usable volatile, thermally labile organic sulfides include the aliphatic mercaptans and sulfides, particularly those containing a tertiary carbon atom; ethyl mercaptan, ethyl sulfide, tertiary butyl mercaptan and tertiary butyl sulfide illustrate the organic members of this class.

The heterocyclization reaction of the invention is conducted in the presence of a solid contact catalyst which may be described chemically as a solid contact material of the class of oxides and sulfides which are stable under reaction conditions. Such catalysts include metal oxides, such as molybdena, which, under the conditions of reaction, may undergo conversion to the corresponding sulfide. It is recognized that certain of the materials classified as catalysts for the subject reaction are really inert catalytically as applied to conventional hydrocarbon conversion reactions. Selection of the particular catalyst to be used depends to a large extent upon the choice of charge stock used in the reaction. The solid contact catalyst usually preferred for general application with alkylated aromatic charge stocks are the solid acid-reacting catalysts, such as amphoteric metal oxides and sulfides which are stable under reaction conditions, such as silica, alumina, etc.

Specific examples of catalysts contemplated for use in the invention are oxides of aluminum, chromium, vanadium, molybdenum, titanium, magnesium, boron, silicon and sulfides of iron, nickel, cobalt, tungsten, tin, etc., as well as mixtures and chemical combinations thereof, such as silica-alumina, acid-treated bentonitic clays, etc.

The familiar class of dehydrogenation catalysts is included within the general classification of solid acid-reacting contact catalysts and are preferred catalysts for the process of this invention. Suitable dehydrogenation catalysts are the oxides and stable sulfides of the metals of group VI of the periodic table. Specifically preferred dehydrogenation catalysts are chromia-alumina, molybdena-alumina and silica-chromia-alumina.

In carrying out the process of the invention, the reactants in vapor form are introduced into a reaction chamber containing a solid contact catalyst maintained at the desired reaction temperature. The catalytic reaction zone may be either a fixed bed type or a fluid type, in which latter type operation the catalyst is maintained in powder form in a turbulent state.

It is evident that the process may be operated in accordance with any of the usual techniques for high temperature catalytic conversions. Thus, fixed catalyst beds may be used in alternate reaction and regeneration cycles; fluid catalyst operation may be used wherein catalyst is continuously withdrawn from the catalyst zone, regenerated and reintroduced into the catalyst zone after regeneration; fluidized fixed bed operation may also be used in which the catalyst particles remain in the reaction zone during alternate reaction and regeneration cycles; stirred catalyst beds as well as moving catalyst beds of the Thermofor type are other possible alternatives.

It will be recognized that the conditions of reaction will vary in accordance with the particular reactant and catalyst employed as well as the type of process technique. As a general proposition, however, a temperature of at least 700° F., a space velocity of about 0.3 to 10, wherein space velocity defines the weights of hydrocarbon per hour per weight of catalyst, and a mol ratio of $H_2S$ to hydrocarbon within the range of 0.5 to 10 are preferred in the majority of reactions.

The process of the present invention, using the prescribed catalysts and particularly dehydrogenation catalysts, such as the oxides and sulfides of metals of group VI of the periodic table, is readily adaptable to commercial operation because the reaction proceeds at economically feasible space velocities. The required contact time of reactants with the catalyst is low and is of the order of 0.7 second. When employing chromia-alumina or molybdena-alumina catalysts, the heterocyclization of alkylated cyclic compounds, in which the alkyl group contains at least two carbon atoms, is advantageously effected at a space velocity within the range of one to five. At such space velocities, the capacity of a commercial unit is of reasonable magnitude to support commercial development.

The particular conditions of reaction are best illustrated by reference to conditions involved in the reaction of an alkyl aromatic hydrocarbon such as styrene over a pelleted chromia-alumina catalyst employing a fixed bed type of process technique. In charging hydrogen sulfide and styrene over a chromia-alumina catalyst, the space velocity advantageously falls within the range of 1.0 to 5.0; the mol ratio of $H_2S$ to styrene preferably lies within the range of 2.0 to 5.0. The temperature in the catalyst zone is maintained between 750 and 1400° F. and preferably between 1050 and 1250° F. It is to be understood the specific conditions described as optimum are those which result in optimum yields of thionaphthene (benzothiophene) in a single pass operation. Where a continuous recycle process is used, it may be desirable to modify these preferred conditions of reaction in order to obtain an optimum ultimate yield of the desired product.

The process period for optimum production of fused cyclic thiophene derivatives will depend to some extent upon the charge stock and reaction conditions employed but will generally be about one hour. In any case, periodic determination of the yield of fused cyclic thiophene derivative will indicate the practical period of catalyst use without regeneration. When the yield of cyclic thiophene derivatives is found to fall off sharply, the catalyst may be regenerated by conventional methods such as regeneration with air at about 1000° F., which methods are typical of the type of catalyst technique employed.

Fused cyclic thiophene compounds produced by the reaction may be recovered from the reaction product in accordance with conventional methods of recovery. For example, the reaction product, obtained by heterocyclization of styrene to thionaphthene, containing unreacted charge stocks, sulfur, cracked products of charge stock and unreacted hydrogen sulfide may be passed through a caustic soda solution to dissolve the acid gases. If the caustic soda solution is maintained cold, thionaphthene will condense as a supernatant layer which can be drawn off therefrom and distilled. If the caustic soda solution is maintained hot, thionaphthene will steam distill therefrom and can then be separated from the water layer and purified by distillation.

The fused cyclic thiophene products of reaction may also be recovered in crude form by a simple condensation procedure using water-cooled condensers or the products may be passed into a cool body of hydrocarbon oil such as diesel fuel or furnace oil having an initial boiling point above 450° F. in which the fused cyclic thiophene compounds condense; fused cyclic thiophene compounds can later be recovered from the condensing oil by distillation.

The process of the invention may be further illustrated by the following specific examples.

Example I

Ethylbenzene and hydrogen sulfide in the mol ratio of about 3.9 mols of hydrogen sulfide per mol of ethylbenzene were mixed, preheated to approximately reaction temperature and charged to a catalytic fixed bed reaction chamber maintained at 1150° F. and atmospheric pressure. The reaction chamber contained a pelleted catalyst which consisted of a mixture of chromic oxide, silica and alumina having the approximate composition of 10 per cent $Cr_2O_3$, 5 per cent $SiO_2$ and 85 per cent $Al_2O_3$. The reactants were charged at a hydrocarbon space velocity of approximately 1.0 weights of ethylbenzene per hour per weight of catalyst. The catalyst was maintained on stream for a period of about 60 minutes without reactivation. Crude thionaphthene of about 95 per cent purity was obtained in a yield of about 38.3 pounds per 100 pounds of ethylbenzene charged; the yield amounted to 54.5 pounds of thionaphthene per 100 pounds of ethylbenzene consumed.

Example II

Ethylbenzene and hydrogen sulfide in a mol ratio of about 3.1 mols of hydrogen sulfide per mol of ethylbenzene were mixed, preheated to approximately reaction temperature and charged to a catalytic reaction chamber maintained at 1205° F. and atmospheric pressure. The catalytic reaction chamber was a vertical reaction zone wherein 500 grams of 100 to 200 mesh catalyst were maintained in a fluidized state by passage of the reactants therethrough. The catalyst consisted of a mixture of chromic oxide and silica-stabilized alumina having the approximate composition of 5 per cent $SiO_2$, 10 per cent $Cr_2O_3$ and 85 per cent $Al_2O_3$ by weight. The reactants were charged at a liquid hydrocarbon space velocity of approximately 2.6 weights of ethylbenzene per hour per weight of catalyst. The catalyst was maintained on stream for a period of about 24 minutes without reactivation. Crude thionaphthene of about 95 per cent purity was obtained in a yield of about 29.6 pounds per 100 pounds of ethylbenzene charged; the yield amounted to 44.9 pounds of thionaphthene per 100 pounds of ethylbenzene consumed.

Example III

Styrene and hydrogen sulfide in a mol ratio of about 4.2 mols of hydrogen sulfide per mol of styrene were mixed, preheated to approximately reaction temperature and charged to a catalytic fixed bed reaction chamber maintained at 1175° F. and atmospheric pressure. The reaction chamber contained a pelleted catalyst which consisted of a mixture of chromic oxide, silica and alumina having the approximate composition of 10 per cent $Cr_2O_3$, 5 per cent $SiO_2$ and 85 per cent $Al_2O_3$. The reactants were charged at a liquid hydrocarbon space velocity of approximately 1.0 weights of styrene per hour per weight of catalyst. The catalyst was maintained on stream for a period of about 63 minutes without reactivation. Crude thionaphthene of about 95 per cent purity was obtained in a yield of 48.2 pounds per 100 pounds of styrene charged; the yield amounted to 64.1 pounds of thionaphthene per 100 pounds of styrene consumed.

Example IV

Styrene and hydrogen sulfide in a mol ratio of about 3.4 mols of hydrogen sulfide per mol of styrene were mixed, preheated to approximately reaction temperature and charged to a catalytic reaction chamber maintained at 1200° F. and atmospheric pressure. The catalytic reaction chamber was a vertical reaction zone wherein 500 grams of 100 to 200 mesh catalyst were maintained in a fluidized state by passage of reactants therethrough. The catalyst consisted of a mixture of chromic oxide and silica-stabilized alumina having the approximate composition of 5 per cent $SiO_2$, 10 per cent $Cr_2O_3$ and 85 per cent $Al_2O_3$ by weight. The reactants were charged at a hydrocarbon space velocity of approximately 3.6 weights of styrene per hour per weight of catalyst. The catalyst was maintained on stream for a period of about 20 minutes without reactivation. Crude thionaphthene of about 95 per cent purity was obtained in a yield of about 37.7 pounds of thionaphthene per 100 pounds of styrene charged; the yield amounted to 54.5 pounds of thionaphthene per 100 pounds of styrene consumed.

Example V

Styrene and hydrogen sulfide in a mol ratio of about 4.4 mols of hydrogen sulfide per mol of styrene were mixed, preheated to approximately reaction temperature and charged to a catalytic fixed bed reaction chamber maintained at 1200° F. and atmospheric pressure. The reaction chamber contained a pelleted catalyst which consisted of a mixture of molybdena and silica-stabilized alumina having the approximate composition of 5 per cent $SiO_2$, 10 per cent $MoO_3$ and 85 per cent $Al_2O_3$. The reactants were charged at a hydrocarbon space velocity of approximately 3.3 weights of styrene per hour per weight of catalyst. Catalyst was maintained on stream for a period of about 19 minutes without reactivation. Crude thionaphthene of about 95 per cent purity was obtained in a yield of about 42 pounds per 100 pounds of styrene charged; the yield amounted to 50 pounds of thionaphthene per 100 pounds of styrene consumed.

*Example VI*

Styrene and hydrogen sulfide in a mol ratio of about four mols of hydrogen sulfide per mol of styrene were mixed, preheated to approximately reaction temperature, and charged to a catalytic fixed bed reaction chamber maintained at 1168° F. and atmospheric pressure. The reaction chamber contained a catalyst which consisted of a mixture of ferrous sulfide and alumina having the approximate composition of 5 per cent FeS and 95 per cent $Al_2O_3$. The reactants were charged at a hydrocarbon space velocity of approximately 2.0 weights of styrene per hour per weight of catalyst. The catalyst was maintained on stream for a period of about 30 minutes without reactivation. Crude thionaphthene of about 95 per cent purity was obtained in a yield of about 7.2 pounds per 100 pounds of styrene charged; the yield amounted to 15.8 pounds of thionaphthene per 100 pounds of styrene consumed.

*Example VII*

Styrene and hydrogen sulfide in a mol ratio of about 4.0 mols of hydrogen sulfide per mol of styrene were mixed, preheated to approximately reaction temperature and charged to a catalytic fixed bed reaction chamber maintained at 1160° F. and atmospheric pressure. The reaction chamber contained a pelleted catalyst which consisted of a mixture of barium oxide and alumina having the approximate composition of 10 per cent BaO and 90 per cent alumina containing about 5 per cent iron oxide. The reactants were charged at a hydrocarbon space veloicty of approximately 2.0 weights of styrene per hour per weight of catalyst. Catalyst was maintained on stream for a period of about 30 minutes without reactivation. Crude thionaphthene of about 95 per cent purity was obtained in a yield of about 10.7 pounds per 100 pounds of styrene charged; the yield amounted to 24.8 pounds per 100 pounds of styrene consumed.

*Example VIII*

Cumene and hydrogen sulfide in a mol ratio of about 3.9 mols of hydrogen sulfide per mol of cumene were mixed, preheated to approximately reaction temperature and charged to a catalytic fixed bed reaction chamber maintained at 1175° F. and atmospheric pressure. The reaction chamber contained a pelleted catalyst which consisted of a mixture of chromia and silica-stabilized alumina having the approximate composition of 5 per cent $SiO_2$, 10 percent $Cr_2O_3$ and 85 per cent $Al_2O_3$. The reactants were charged at a hydrocarbon space velocity of approximately 1.8 weights of cumene per hour per weight of catalyst. The catalyst was maintained on stream for a period of about 33 minutes without reactivation. Analysis of the products showed that both thionaphthene and 3-methyl thionaphthene were obtained in approximately equivalent quantities. The yield of crude thionaphthene of about 95 per cent purity was about 7 pounds per 100 pounds of cumene charged; the yield of 3-methyl thionaphthene of like purity was 6 pounds per 100 pounds of cumene charged, or 13 pounds of 3-methyl thionaphthene per 100 pounds of cumene consumed. Thionaphthene and 3-methyl thionaphthene were separated from one another by fractional distillation; thionaphthene distilled between 175–194° F. at 10 mm., whereas the 3-methyl thionaphthene distilled between 210–225° F. at 10 mm. 3-methyl thionaphthene is not reported in the literature but was identified by its elemental analysis, by its picrate and by the ortho-ethyl thiophenol obtained by alkaline fusion of 3-methyl thionaphthene with potassium hydroxide.

*Example IX*

Para-cymene and hydrogen sulfide in a mol ratio of about 4.1 mols of hydrogen sulfide per mol of p-cymene were mixed, preheated to approximately reaction temperature and charged to a catalytic fixed bed reaction chamber maintained at 1183° F. and atmospheric pressure. The reaction chamber contained a pelleted catalyst which consisted of a mixture of chromia and silica-stabilized alumina having the approximate composition of 5 per cent $SiO_2$, 10 per cent $Cr_2O_3$ and 85 per cent $Al_2O_3$. The reactants were charged at a hydrocarbon space velocity of approximately 1.7 weights of p-cymene per hour per weight of catalyst. The catalyst was maintained on stream for a period of about 35 minutes without reactivation. Analysis of the product mixture indicated that thionaphthene, methyl thionaphthene and dimethyl thionaphthene were obtained. The thionaphthene homologs were separated one from another by fractional distillation whereby there were obtained a thionaphthene fraction distilling at 175–194° F. at 10 mm., a 3-methyl thionaphthene fraction distilling at 219–221° F. at 10 mm. and a 3,6-dimethyl thionaphthene distilling at 246–250° F. at 10 mm. The yield of thionaphthene was about 3.4 pounds per 100 pounds of p-cymene charged; the yield of 3-methyl thionaphthene was about 5.0 pounds per 100 pounds of p-cymene charged; the yield of 3,6-dimethyl thionaphthene was 5.3 pounds per 100 pounds of p-cymene charged or 9.0 pounds per 100 pounds of p-cymene consumed. 3,6-dimethyl thionaphthene was identified by its elemental analysis, by a comparison of its observed boiling point, namely 246–250° F. at 10 mm., with its estimated boiling point, namely 252° F. determined from the boiling point of dimethylnaphthalene and by the formation of a picrate which has a melting point of 199–203° F.

It will be understood, of course, that these examples are merely illustrative of the preferred embodiment of the invention and that other catalyst charge stocks and conditions of reactivation may be employed in accordance with the previous description. By using other selected alkyl cyclic compounds, fused cyclic thiophene derivatives containing various substituents may be produced by the present process. Thus, other alkyl aryl derivatives containing substituents on the aryl nucleus may be employed to produce nuclear substituted thionaphthene derivatives. Further alkyl derivatives of naphthenes or heterocyclics in which the alkyl group contains two or more carbon atoms may be employed to prepare a variety of compounds containing a thiophene nucleus.

Obviously, many modifications and variations of the invention, as hereinbefore set forth, may be made without departing from the spirit and scope thereof and, therefore, only such limitations should be imposed as are indicated in the appended claims.

We claim:

1. A process for preparing fused cyclic derivatives of thiophene which comprises reacting a cyclic compound selected from the group consisting of carbocyclic and heterocyclic compounds which contain a saturated alkyl side chain of at least two carbon atoms and a hydrogen atom on a nuclear carbon atom adjacent to said alkyl side chain with a sulfide of the class consisting of hydrogen sulfide, volatile thermally labile sulfides and mixtures thereof in the presence of a solid contact catalyst at an elevated temperature of at least 700° F.

2. The process according to claim 1 in which the solid contact catalyst is a dehydrogenation catalyst.

3. A process according to claim 1 in which the solid contact catalyst is a compound selected from the class consisting of Group VI metal oxides and sulfides supported on a surface-active material.

4. A process according to claim 1 in which the solid contact catalyst is alumina containing a minor portion of iron.

5. A process for preparing fused aryl derivatives of thiophene which comprises reacting an aryl compound containing a saturated alkyl side chain of at least two carbon atoms and a hydrogen atom on a nuclear carbon atom adjacent to said alkyl side chain with a sulfide of the class consisting of hydrogen sulfide, volatile thermally labile sulfides and mixtures thereof in the presence of a solid contact catalyst at an elevated temperature of at least 700° F.

6. A process for the production of fused aryl derivatives of thiophene which comprises reacting an aryl compound containing a saturated alkyl side chain of at least two carbon atoms and a hydrogen atom on a nuclear carbon atom adjacent to said alkyl side chain with hydrogen sulfide in the presence of a solid contact catalyst at an elevated temperature of at least 700° F.

7. A process according to claim 6 in which the solid contact catalyst is selected from the group consisting of dehydrogenation catalysts.

8. A process according to claim 6 in which the solid contact catalyst is a compound selected from the class consisting of group VI metal oxides and sulfides supported on a surface-active material.

9. A process for the production of thionaphthene which comprises reacting ethylbenzene with hydrogen sulfide in the presence of a solid contact catalyst at an elevated temperature of at least 700° F.

10. A process according to claim 9 in which the solid contact catalyst comprises a compound selected from the group consisting of the oxides and sulfides of Group VI metals and a surface-active material.

11. A process according to claim 9 in which the solid contact catalyst is alumina containing a minor portion of iron.

12. A process for preparing fused cyclic derivatives of thiophene which comprises reacting a carbocyclic compound which contains a hydrogen atom on a nuclear carbon atom adjacent to an alkyl side chain of at least two carbon atoms, which is not in conjugated relationship with an olefinic bond in said carbocyclic compound, with a sulfide of the class consisting of hydrogen sulfide, volatile thermally labile sulfides and mixtures thereof in the presence of a solid contact catalyst at an elevated temperature of at least 700° F.

13. A process for preparing fused cyclic derivatives of thiophene which comprises reacting an aryl compound which contains a hydrogen atom on a nuclear carbon atom adjacent to an alkyl side chain of at least two carbon atoms, which is not in conjugated relationship with an olefinic bond in said aryl compound, with a sulfide of the class consisting of hydrogen sulfide, volatile thermally labile sulfides and mixtures thereof in the presence of a solid contact catalyst at an elevated temperature of at least 700° F.

14. A process for preparing fused cyclic derivatives of thiophene which comprises reacting a naphthenic compound which contains a hydrogen atom on a nuclear carbon atom adjacent to an alkyl side chain of at least two carbon atoms which is not in conjugated relationship with an olefinic bond in said naphthenic compound, with a sulfide of the class consisting of hydrogen sulfide, volatile thermally labile sulfides and mixtures thereof in the presence of a solid contact catalyst at an elevated temperature of at least 700° F.

RUSH F. McCLEARY.
LAWRENCE W. DEVANEY.

REFERENCES CITED

The following references are of record in the file of this patent:

UNITED STATES PATENTS

| Number | Name | Date |
| --- | --- | --- |
| 2,109,692 | Forney | Mar. 1, 1938 |
| 2,168,840 | Groll | Aug. 8, 1939 |
| 2,316,086 | MacLaren | Apr. 6, 1943 |
| 2,478,914 | Greensfelder | Aug. 16, 1949 |

OTHER REFERENCES

Steinkopf, Die Chemie Des Thiophens, page 160, Edwards Lithoprint of 1941 publication.

Moore and Greensfelder, J. Am. Chem. Soc. 69, 2008–2009 (Aug. 1947).